United States Patent
Steele et al.

(10) Patent No.: US 12,135,010 B2
(45) Date of Patent: Nov. 5, 2024

(54) PROVIDING SAFETY CONFIGURATION PARAMETERS FOR A WIND TURBINE

(71) Applicant: VESTAS WIND SYSTEMS A/S, Aarhus N (DK)

(72) Inventors: David Steele, Skanderborg (DK); Keld Hammerum, Hadsten (DK); Rolf Kiilerich Andersen, Aarhus V (DK); Martin Møller Sørensen, Viby J (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 255 days.

(21) Appl. No.: 17/632,482

(22) PCT Filed: Jul. 7, 2020

(86) PCT No.: PCT/DK2020/050205
§ 371 (c)(1),
(2) Date: Feb. 2, 2022

(87) PCT Pub. No.: WO2021/023348
PCT Pub. Date: Feb. 11, 2021

(65) Prior Publication Data
US 2022/0282708 A1    Sep. 8, 2022

(30) Foreign Application Priority Data
Aug. 2, 2019  (DK) .......................... PA 2019 70491

(51) Int. Cl.
  *F03D 17/00*  (2016.01)
  *F03D 7/02*   (2006.01)
  *F03D 7/04*   (2006.01)
(52) U.S. Cl.
  CPC ........... *F03D 17/00* (2016.05); *F03D 7/0284* (2013.01); *F03D 7/045* (2013.01); *F03D 7/047* (2013.01);
(Continued)

(58) Field of Classification Search
  CPC ........ F03D 17/00; F03D 7/0284; F03D 7/047; F05B 2260/80; G06F 21/51; G06F 21/572; G06F 21/64; G06F 21/31
See application file for complete search history.

(56) References Cited

U.S. PATENT DOCUMENTS

| 7,774,774 B1 | 8/2010 | Mulligan et al. |
| 2005/0144437 A1* | 6/2005 | Ransom ............... G06F 1/28 700/286 |

(Continued)

FOREIGN PATENT DOCUMENTS

| CN | 101994648 A | 3/2011 |
| CN | 102395784 A | 3/2012 |

(Continued)

OTHER PUBLICATIONS

Danish Patent and Trademark Office, 1st Technical Examination including the Search Report and Search Opinion for Application PA 2019 70491 dated Mar. 27, 2020.

(Continued)

*Primary Examiner* — Nicholas Klicos
(74) *Attorney, Agent, or Firm* — Patterson + Sheridan, LLP

(57) ABSTRACT

A method of providing safety configuration parameters for a wind turbine is provided. The method comprises receiving a safety configuration file at a location of the wind turbine, and comparing a turbine ID associated with the safety configuration file to a turbine ID of the wind turbine stored at the location of the wind turbine. A tamper check is performed on the safety configuration file to determine if data in the safety configuration file has been modified. If the turbine ID associated with the safety configuration file matches the turbine ID of the wind turbine, and if the tamper check determines that the data has not been modified, a safety (Continued)

configuration parameter associated with a safety system of the wind turbine is extracted from the file and stored.

20 Claims, 3 Drawing Sheets

(52) U.S. Cl.
CPC ....... *F05B 2260/80* (2013.01); *F05B 2260/84* (2013.01); *F05B 2270/107* (2013.01)

(56) References Cited

U.S. PATENT DOCUMENTS

| | | | | |
|---|---|---|---|---|
| 2009/0187772 | A1* | 7/2009 | Lange | H04N 7/165 |
| | | | | 713/193 |
| 2009/0240946 | A1* | 9/2009 | Yeap | H04L 63/0823 |
| | | | | 713/176 |
| 2011/0055584 | A1* | 3/2011 | Meier | F03D 7/047 |
| | | | | 726/4 |
| 2011/0138377 | A1* | 6/2011 | Allen | G01D 4/004 |
| | | | | 717/173 |
| 2011/0140431 | A1* | 6/2011 | Landa | F03D 7/0224 |
| | | | | 290/44 |
| 2011/0302397 | A1* | 12/2011 | Mitola, III | G06F 9/524 |
| | | | | 712/241 |
| 2013/0015806 | A1* | 1/2013 | Silbermann | G07F 15/003 |
| | | | | 320/101 |
| 2013/0207783 | A1 | 8/2013 | Cruzado et al. | |
| 2014/0059534 | A1 | 2/2014 | Daum et al. | |
| 2014/0101771 | A1* | 4/2014 | Tandon | G06F 21/554 |
| | | | | 726/26 |
| 2014/0108786 | A1* | 4/2014 | Kreft | G06Q 20/3825 |
| | | | | 713/194 |
| 2015/0115609 | A1* | 4/2015 | Bohlen | F03D 7/047 |
| | | | | 290/44 |
| 2015/0188944 | A1* | 7/2015 | Dyer | H04L 63/1416 |
| | | | | 726/3 |
| 2016/0201648 | A1 | 7/2016 | Steele et al. | |
| 2018/0287886 | A1* | 10/2018 | Kv | F03D 9/257 |
| 2018/0365423 | A1 | 12/2018 | Poppe | |
| 2021/0071639 | A1* | 3/2021 | Warfen | F03D 7/047 |
| 2021/0111870 | A1* | 4/2021 | Cooper | H04L 9/3234 |
| 2021/0388816 | A1* | 12/2021 | Rust | F03D 7/047 |

FOREIGN PATENT DOCUMENTS

| | | |
|---|---|---|
| CN | 104204514 A | 12/2014 |
| CN | 106157436 A | 11/2016 |
| CN | 107110120 A | 8/2017 |
| CN | 109683933 A | 4/2019 |
| EP | 0918275 A2 | 5/1999 |
| EP | 2876554 A1 | 5/2015 |
| EP | 3101491 A1 | 12/2016 |
| JP | 2018109369 A | 7/2018 |
| WO | 2013152776 A1 | 10/2013 |
| WO | 2019215147 A1 | 11/2019 |
| WO | 2021023348 A1 | 2/2021 |

OTHER PUBLICATIONS

PCT, International Search Report and Written Opinion of The International Searching Authority for Application PCT/DK2020/050205 dated Sep. 17, 2020.
European Patent Office, Office Action for European Patent Application No. 20 739 850.4-1002, dated Jul. 26, 2023.
Chinese Patent Office, 1st Office Action for Chinese Patent Application No. 202080068462.0, dated Apr. 26, 2024.

* cited by examiner

PROVIDING SAFETY CONFIGURATION PARAMETERS FOR A WIND TURBINE

FIELD OF THE INVENTION

The present invention relates to wind turbines, and in particular to safety systems of wind turbines.

BACKGROUND OF THE INVENTION

Wind turbines typically comprise a number of safety systems, distinct from the control systems, which act to ensure safe operation of the wind turbine. For example, the safety systems may limit operation of the wind turbine to prevent rotor speed, blade loads, or pitching from reaching dangerous levels at which damage to the wind turbine would be likely. These safety systems limit operation of the turbine based on safety configuration parameters, typically stored locally on the wind turbine. For example, the safety configuration parameters may include a maximum rotor speed or blade load.

In conventional wind turbines, the safety configuration parameters are generally selected from a small number of pre-established fixed configurations during construction of the wind turbine. Due to the sensitive nature of turbine safety configurations, the relevant national/international standards require that all hardware and software configurations be tested before they are deployed, and that there is certainty in the deployment process such that the only the correct safety configurations are deployed on the correct wind turbine (see e.g. EN 62061, EC 61508, ISO 13849-1). As a result, the safety configuration parameters of a given wind turbine are generally kept the same throughout the lifetime of the turbine, or are only changed when absolutely necessary.

As wind turbine fleets become larger and more global, updating the safety parameters of an individual wind turbine becomes more even more difficult. The chance of error increases, for example human errors in selecting the correct configuration for a given turbine increases, as does the possibility of attempted sabotage by intentional uploading of incorrect safety configuration parameters, and the likelihood of cyberattack seeking to modify the safety parameters.

Together, these factors provide an inertia against updating safety configuration parameters of an existing wind turbine, even where those safety configuration parameters are unnecessarily restricting performance of the wind turbine.

SUMMARY OF THE INVENTION

A first aspect of the invention provides a method of providing safety configuration parameters for a wind turbine, the method comprising:
  receiving, at a location of the wind turbine, a safety configuration file;
  comparing a turbine ID associated with the safety configuration file to a turbine ID of the wind turbine stored at the location of the wind turbine;
  performing a tamper check on the safety configuration file to determine if data in the safety configuration file has been modified; and
  if the turbine ID associated with the safety configuration file matches the turbine ID of the wind turbine, and the tamper check determines that the data has not been modified:
    extracting, from the safety configuration file, a safety configuration parameter associated with a safety system of the wind turbine; and
    storing the safety configuration parameter.

In some embodiments, performing the tamper check may comprise comparing an aspect of the data in the safety configuration file to an expected result.

In some embodiments, performing the tamper check may comprise comparing a data structure of the safety configuration file to an expected data structure.

In some embodiments, at least a portion of the safety configuration file may be encrypted. Performing the tamper check may comprise decrypting the encrypted portion of the safety configuration file.

In some embodiments the encrypted portion of the safety configuration file may comprise an encrypted form of the turbine ID associated with the safety configuration file. In such embodiments, the method may further comprise, after decrypting the encrypted portion, comparing the turbine ID in the decrypted portion to the turbine ID stored at the location of the wind turbine.

In some embodiments, the safety configuration file may be received by a control system of the wind turbine, and wherein the step of performing the tamper check is performed by the or a safety system of the wind turbine.

In some embodiments the method may further comprise requesting, by the safety system, updated safety configuration parameters. The safety configuration file may be received in response to the request for updated safety configuration parameters.

In some embodiments the method may further comprise:
  providing default safety configuration parameters for the safety system for use during an initial operation period of the wind turbine; and
  requesting an update of the safety configuration parameters for use after the initial operation period.

In some embodiments, the safety configuration parameters included in the safety configuration file may be specific to the wind turbine, to a wind turbine model, and/or to a location of the wind turbine.

In some embodiments the safety configuration file may be received from a remote safety configuration database via a network. Alternatively the safety configuration file may be received from a portable storage device.

In some embodiments, if the turbine ID associated with the safety configuration file does not match the turbine ID of the wind turbine; or the tamper check determines that data has been modified, the method may comprise:
  rejecting the data configuration file; and
  retaining an existing safety configuration parameter of the safety system.

A second aspect of the invention provides a wind turbine comprising:
  a control system for controlling operation of the wind turbine; and
  one or more safety systems, each safety system configured to limit an aspect of the operation of the wind turbine in accordance with one or more safety control parameters;
  wherein the wind turbine is configured to receive a safety configuration file and to update the one or more safety control parameters of the one or more safety systems in accordance with the method of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

As discussed above, the critical nature of the safety configuration parameters, and requirements of the relevant standards and regulations, limits the scope for updating safety configuration parameters after construction of a wind turbine: and means that safety configuration settings are selected from a small number of tested options. However, each wind turbine experiences different conditions, depending on the location of the turbine and the design of the turbine. These factors may mean that a first turbine needs relatively stringent safety parameters due to experienced conditions, whereas a second turbine, of the same type but at a different location, does not need such stringent parameters. However, the nature of safety parameters selected from a small pool is such that they must be set for the worst case scenario—so the more stringent requirements will still be used for the second turbine even though they restrict performance of the turbine more than is needed. Moreover, the difficulty in updating safety configuration parameters means that even where the operational conditions of a particular turbine become better understood over time, the safety configuration parameters are not adapted to match.

Figure 1:
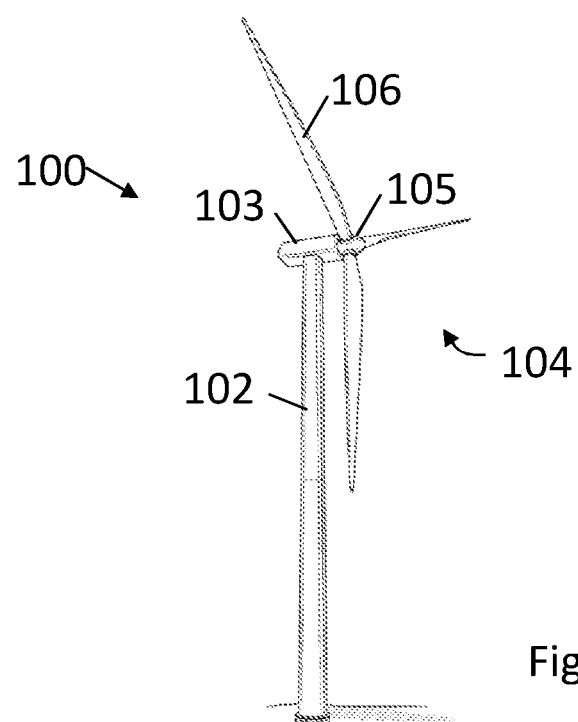
FIG. 1 is a schematic representation of a wind turbine.

The methods discussed herein allow for simpler and more frequent updating of safety parameters, in a way which ensures the integrity of the parameters and so meets the requirements of the relevant standards. As a result, safety configuration parameters that are better suited to an individual turbine can be easily implemented as an update, allowing for better performance of the wind turbine, FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
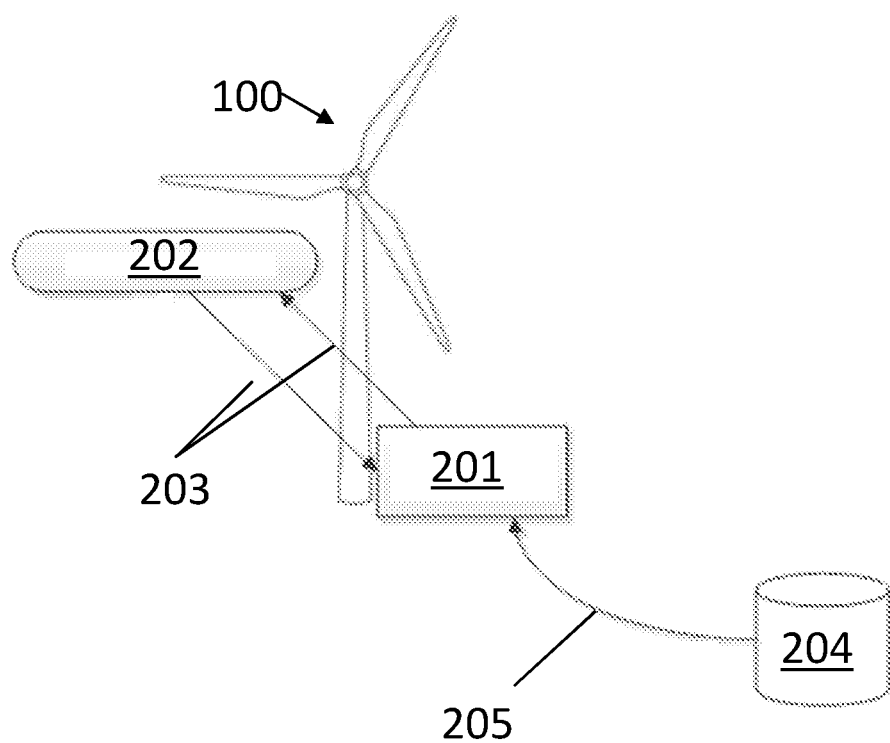
FIG. 2 schematically illustrates control and safety systems of the wind turbine.

FIG. 2 illustrates the control and safety systems of wind turbine 100. The wind turbine 100 comprises a control system 201, and one or more safety systems 202 (only one is shown in FIG. 2 for clarity). The control system 201 comprises elements which direct production of electricity by the wind turbine, by controlling pitch of the blades 106 and the amount of power extracted to the grid. The safety systems 202 comprise a number of safety nodes, each associated with a respective safety mechanism or control. For example, the safety mechanism may be emergency brakes on the rotor, or emergency pitch control. The control system 201 and safety systems are in communication with each other (as represented by the arrows 203 in FIG. 2), but are distinct systems within the wind turbine 100.

Each of the safety systems 202 limit an aspect of operation of the wind turbine 100 based on respective safety configuration parameters. These safety configuration parameters may typically be stored in non-volatile memory within the wind turbine 100.

In the present invention, non-volatile memory in or associated with the turbine 100 (e.g. adjacent or proximate to the turbine 100, at the turbine location), is also used to store a unique turbine identification number ("turbine ID"). The turbine ID is set during commissioning of the turbine 100, and can be used to uniquely identify the turbine 100 amongst the entire, global fleet of wind turbines 100, As the turbine ID will be used as a verification check in the method of updating the safety configuration parameters discussed below, it may preferably be checked by multiple personnel when being entered; or may be used for other purposes within the wind turbine, such that mistakes in the turbine ID stored on the turbine 100 would be identified before safety configuration updates are attempted.

In the embodiment shown in FIG. 2, the control system 201 of the turbine 100 is connected to a remote safety configuration database 204 via a network connection 205 (which may be a wired or wireless network connection, and may be a private network connection or the connection may be via the Internet). The remote safety configuration database 204 stores the complete, individual, safety configuration parameters for a plurality of wind turbines 100 (e.g. all wind turbines in a fleet, or all wind turbines in a region), These individual safety configuration parameters can be updated to refine operation of the individual turbine, for example in response to performance data reported by that wind turbine 100. The updated remote safety configuration parameters may then be transferred to the individual wind turbine 100 using the method 300 described below. Data in the safety configuration database 204 may be encrypted.

Figure 3:
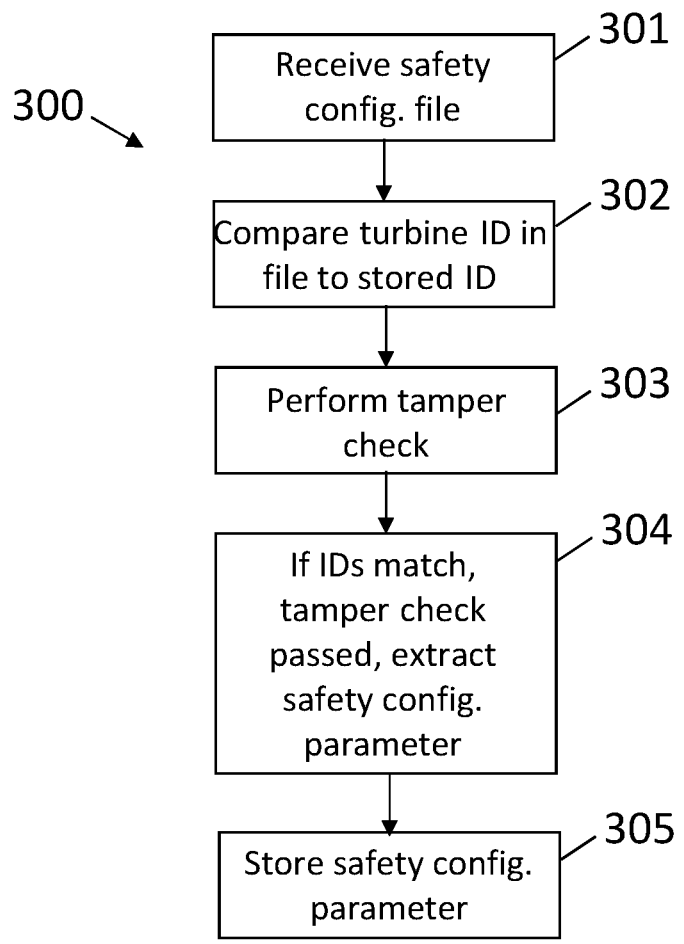
FIG. 3 illustrates a method of providing safety configuration parameters to the wind turbine.

FIG. 3 illustrates method 300 of providing safety configuration parameters to a wind turbine 300.

The method 300 starts at step 301, at which a safety configuration file is received at a location of a wind turbine 10, such as at the wind turbine 100 itself, or at the wind park of which turbine 100 is a part. For example, the safety configuration file may be transmitted from the remote safety configuration database 204, and may be received at the control system 201 of the turbine 100.

The safety configuration file comprises one or more safety configuration parameters intended for the individual wind turbine 100. The safety configuration parameter's may relate to only one safety system/node of the turbine 100, or multiple/all safety systems of the turbine 100, The safety configuration parameters included in the safety configuration file may be specific to the wind turbine, to a wind turbine model, and/or to a location of the wind turbine. In particular embodiments, the complete set of safety configuration parameters may be unique to a specific turbine 100, but individual parameters in the set may be common between different turbines 100.

At step 302, a turbine ID associated with the safety configuration file is compared to a turbine ID of the wind turbine stored at the location of the wind turbine (e.g. on non-volatile memory of the turbine 100, as discussed above). This step provides a first check that parameters in the safety configuration file are actually intended for that turbine 100, preventing the wrong parameters from being applied to the turbine 100.

At step 303, a tamper check is performed on the safety configuration file to determine if data in the safety configuration file has been modified. The tamper check ensures that there has been no accidental or deliberate changes to the safety configuration parameter/s contained in the received file, ensuring security of the parameters and so allowing the method 300 meet the required standards for safety configuration parameter provision.

The tamper check of step 303 may comprise a data integrity check. For example, the tamper check may comprise comparing an aspect of the data in the file to an expected result. The expected result may be stored only on the turbine 100, and in particular only on the relevant safety system 202, ensuring the secrecy of the expected result. If the tamper check yields the expected result, it is determined that the data has not been modified.

The tamper check may for example comprise running an algorithm on the file, or a portion of the data in the file. The algorithm may be a check sum. Alternatively or additionally, the data structure of the file may be compared to an expected (secret) data format. The algorithm may be capable of performing error correction on the received file, to restore the original data of the file.

In some embodiments, at least a portion of the file may be encrypted, A secret decryption key stored on the turbine 100 (and specifically on the relevant safety system 202, or a "gateway" safety system used to initially receive the configuration file). The tamper check of step 303 may then comprise decrypting the file. The determination that the data has not been tampered with may be made based on successful decryption of the file. Alternatively, a further tamper check/data integrity check, similar to those described above, may then be performed on the decrypted data to ensure integrity of the safety configuration parameter/s received in the file. The decrypted data may also comprise the turbine ID. In some embodiments, this decrypted turbine ID may be compared to the turbine ID stored at the turbine 100. This may provide an additional check of the turbine ID, or may be used as the check of step 302. It is noted that steps 302 and 303 may be performed in any order.

If the checks of steps 302 and 303 are passed, i.e. if the turbine ID associated with the safety configuration file matches the turbine ID of the wind turbine, and the tamper check determines that the data has not been modified, the method 300 proceeds to step 304.

At step 304, a safety configuration parameter associated with a safety system 202 of the wind turbine 100 is extracted from the safety configuration file. The method then proceeds to step 305, at which the extracted safety configuration parameter is stored on the wind turbine 100. The wind turbine 100 may then be operated in accordance with the extracted parameter—i.e. controlling the relevant safety system of the turbine 100 in accordance with the extracted parameter. Where the relevant safety system of the turbine 100 had an existing corresponding safety parameter, the method 300 may comprise replacing the corresponding parameter with the extracted parameter.

If, on the other hand, the turbine ID associated with the safety configuration file does not match the turbine ID of the wind turbine; or if the tamper check determines that data has been modified, the method does not proceed to steps 304 and 305. Instead, data configuration file may be rejected, and an existing safety configuration parameter of the relevant safety system may be retained.

The method 300 allows safety configuration parameters to be implemented on individual turbines 100 in an efficient and robust manner. The multiple checks performed as part of the method 300 ensure that the correct safety configuration parameters are sent to the correct turbine 100, and ensure the integrity of the data sent against accidental error or intentional sabotage.

The method 300 may be performed when commissioning a new turbine 100, to provide safety configuration parameters to the turbine 100 for the first time. The method 300 may also be performed periodically, or may be used to push updates to a turbine 100 when safety configuration parameters are updated centrally, such as on the remote safety configuration database 204. Alternatively or additionally, the turbine 100 itself may request one or more safety configuration parameters, for example by sending a request including the turbine ID to the remote safety configuration database 204. The request may be initiated by one of the individual safety systems 202 of the wind turbine 100. Where the turbine 100 does not have a particular safety configuration parameter, or where a predetermined time has passed since the last time a particular safety configuration parameter was last received at the turbine 100, operation of the turbine 100 may be limited to ensure continued safety.

In some embodiments, such as that shown in FIG. 2, the safety configuration file may be received initially by the control system 201. This may allow existing control system connections to be used to transmit and receive the safety configuration file. In these embodiments, the control system 201 does not know the decryption algorithm/expected result required to extract data from the file. The file is instead passed to the safety system 202 of the turbine 100. A central processor common to the safety systems, or a "gateway" safety system used to receive the file, may perform the checks 302 and 303 before extracting the safety configuration parameter and passing the parameter on to the relevant safety system 202. Alternatively, for additional security and robustness, the decryption algorithm/expected result needed to extract the parameter may only be known by the relevant safety system. In such cases, the file (or a relevant portion of it) may be passed to the relevant safety system, which then performs at least the tamper check of step 303 itself.

As an alternative to receiving the safety configuration file from a remote database, the safety configuration file may be received from a portable storage device, such as a USB key or portable hard drive. A service operator may connect the portable storage device directly to the turbine 100, or to a wind park controller which is in turn in communication with the wind turbine 100 to deliver the safety configuration file. The turbine 100 will then perform the checks of steps 302 and 303 of method 300, ensuring integrity of the received safety configuration parameter/s. Such embodiments may be particularly useful where a network connection to the wind turbine 100 is not available or is not reliable, such as during construction of the wind turbine 100.

In some embodiments, in the early stages of turbine commissioning, it may not be possible for the turbine's specific safety configuration parameters to be received. For example, the unique turbine ID may not yet have not been determined for the turbine or may otherwise be unavailable, preventing selection of the correct parameters. In such embodiments, default safety configuration parameters may be provided for use during an initial operation period of the wind turbine. For example, the turbine 100 may use a pre-agreed default ID to requesting safety configuration parameters from the remote database 203, or alternatively from local storage. The default safety configuration parameters may be deployed with the turbine control system software and may always be available, even when the network is not present and safety configuration parameters have never been retrieved from an outside server or programmed by service personnel. Alternately, the default parameters may be hard coded on each of the individual safety systems 202 in their own software and used automatically when unique turbine identifiers have not been programmed. The default parameters may be designed to be safe for any of the possible turbine setups at any site where turbines can be erected. As such, they may provide for restricted, de-rated performance, by providing the most restrictive parameter set possible. Service personnel can then perform limited commissioning and testing until unique turbine identifiers/individual turbine safety control parameters have been obtained.

Although described above as a method, the present invention may also be implemented as a computer program product comprising software code adapted to the methods described above.

Further, although the invention has been described above with reference to one or more preferred embodiments, it will be appreciated that various changes or modifications may be made without departing from the scope of the invention as defined in the appended claims.

The invention claimed is:

1. A method of providing safety configuration parameters for a wind turbine, the method comprising:
   receiving, at a location of the wind turbine, a safety configuration file;
   comparing a turbine ID associated with the safety configuration file to a turbine ID of the wind turbine stored at the location of the wind turbine;
   performing a tamper check on the safety configuration file to determine if data in the safety configuration file has been modified; and
   determining that the turbine ID associated with the safety configuration file matches the turbine ID of the wind turbine and that the data has not been modified by performing the tamper check:
      extracting, from the safety configuration file, a safety configuration parameter associated with a safety system of the wind turbine, wherein the safety configuration parameter is specific to the wind turbine, with the safety configuration parameter being obtained based on testing performed on the wind turbine itself subsequent to an initial operation period;
      storing the safety configuration parameter; and
      updating an existing safety configuration parameter with the safety configuration parameter.

2. The method of claim 1, wherein performing the tamper check comprises comparing an aspect of the data in the safety configuration file to an expected result.

3. The method of claim 1, wherein performing the tamper check comprises comparing a data structure of the safety configuration file to an expected data structure.

4. The method of claim 1, wherein at least a portion of the safety configuration file is encrypted, and wherein the performing the tamper check comprises decrypting the encrypted portion of the safety configuration file.

5. The method of claim 4, wherein the encrypted portion of the safety configuration file comprises an encrypted form of the turbine ID associated with the safety configuration file, and
   wherein the method further comprises, after decrypting the encrypted portion, comparing the turbine ID in the decrypted portion to the turbine ID stored at the location of the wind turbine.

6. The method of claim 1, wherein the safety configuration file is received by a control system of the wind turbine, and wherein the step of performing the tamper check is performed by the control system or a safety system of the wind turbine.

7. The method of claim 1, further comprising requesting, by the safety system, updated safety configuration parameters, and
   wherein the safety configuration file is received in response to the request for updated safety configuration parameters.

8. The method of claim 1, wherein the method further comprises:
   providing default safety configuration parameters for the safety system for use during the initial operation period of the wind turbine; and
   requesting an update of the safety configuration parameters for use after the initial operation period.

9. The method of claim 1, wherein the safety configuration parameter included in the safety configuration file is specific to the location of the wind turbine.

10. The method of claim 1, wherein the safety configuration file is received from a remote safety configuration database via a network.

11. The method of claim 1, wherein when the turbine ID associated with the safety configuration file does not match the turbine ID of the wind turbine; or the tamper check determines that data has been modified, the method comprises:
    rejecting the safety configuration file; and
    retaining an existing safety configuration parameter of the safety system.

12. The method of claim 1, wherein the wind turbine is one of a plurality of wind turbines, and wherein the method further comprises:
    receiving, at a location of a second wind turbine of the plurality of wind turbines, a second safety configuration file;
    in response to determining that a turbine ID associated with the second safety configuration file matches a second turbine ID of the second wind turbine and that data in the second safety configuration file has not been modified by performing a second tamper check:
       extracting, from the second safety configuration file, a second safety configuration parameter associated with a safety system of the second wind turbine, wherein the second safety configuration parameter is specific to the second wind turbine, with the second safety configuration parameter being obtained based on testing performed on the second wind turbine itself subsequent to an initial operation period of the second wind turbine, wherein the second safety configuration parameter is different than the safety configuration parameter;

storing the second safety configuration parameter; and updating a second existing safety configuration parameter with the second safety configuration parameter.

13. A wind turbine, comprising:

a control system for controlling operation of the wind turbine; and one or more safety systems communicatively coupled to the control system, each safety system configured to limit an aspect of the operation of the wind turbine in accordance with one or more safety control parameters, wherein at least one, or both in combination, of the control system and the one or more safety systems is configured to perform an operation, comprising:

receiving a safety configuration file; and updating the one or more safety configuration parameters of at least one of the one or more safety systems, wherein the one or more safety configuration parameters are specific to the wind turbine, with the one or more safety configuration parameters being obtained based on testing performed on the wind turbine itself subsequent to an initial operation period.

14. The wind turbine of claim 13, wherein the updating comprises:

comparing a turbine ID associated with the safety configuration file to a turbine ID of the wind turbine;

performing a tamper check on the safety configuration file to determine whether data in the safety configuration file has been modified; and upon determining that the turbine ID associated with the safety configuration file matches the turbine ID of the wind turbine, and the tamper check determines that the data has not been modified:

extracting, from the safety configuration file, the one or more safety configuration parameters associated with a safety system of the wind turbine; and storing the one or more safety configuration parameters.

15. The wind turbine of claim 14, wherein performing the tamper check comprises comparing an aspect of the data in the safety configuration file to an expected result.

16. The wind turbine of claim 14, wherein performing the tamper check comprises comparing a data structure of the safety configuration file to an expected data structure.

17. The wind turbine of claim 14, wherein the turbine ID is stored in a storage device disposed at the wind turbine.

18. The wind turbine of claim 14, wherein at least a portion of the safety configuration file is encrypted, and wherein the performing the tamper check comprises decrypting the encrypted portion of the safety configuration file.

19. The wind turbine of claim 18, wherein the encrypted portion of the safety configuration file comprises an encrypted form of the turbine ID associated with the safety configuration file, and wherein the operation further comprises, after decrypting the encrypted portion, comparing the turbine ID in the decrypted portion to the turbine ID stored at a location of the wind turbine.

20. The wind turbine of claim 13, wherein the operation further comprises:

providing default safety configuration parameters for the one or more safety systems for use during the initial operation period of the wind turbine; and requesting an update of the one or more safety configuration parameters for use after the initial operation period.

* * * * *